US012676446B2

(12) United States Patent
Peng

(10) Patent No.: US 12,676,446 B2
(45) Date of Patent: Jul. 7, 2026

(54) CONNECTOR CAPABLE OF CONVERTING MARINE NAVIGATION LIGHT TO CHARGING EQUIPMENT

(71) Applicant: Shih-Chieh Peng, Taichung City (TW)

(72) Inventor: Shih-Chieh Peng, Taichung City (TW)

( * ) Notice: Subject to any disclaimer, the term of this patent is extended or adjusted under 35 U.S.C. 154(b) by 340 days.

(21) Appl. No.: 18/433,134

(22) Filed: Feb. 5, 2024

(65) Prior Publication Data

US 2025/0253603 A1 Aug. 7, 2025

(51) Int. Cl.

| | |
|---|---|
| ***H01R 31/06*** | (2006.01) |
| ***H01R 13/639*** | (2006.01) |
| ***H01R 13/717*** | (2006.01) |
| ***H01R 24/68*** | (2011.01) |

(52) U.S. Cl.

CPC ........... *H01R 31/06* (2013.01); *H01R 13/639* (2013.01); *H01R 13/717* (2013.01); *H01R 24/68* (2013.01)

(58) Field of Classification Search

CPC ...... H01R 31/06; H01R 33/94; H01R 13/717; H01R 24/68; H01R 31/065; H01R 13/6675; H01R 13/66–6691; B63B 45/04; B63B 45/02; B60Q 1/0483

USPC .................................................. 439/638, 949

See application file for complete search history.

(56) References Cited

U.S. PATENT DOCUMENTS

| | | | | |
|---|---|---|---|---|
| 5,704,704 A * | 1/1998 | Reichard | B63B 45/04 |
| | | | 362/267 |
| 10,033,203 B1 * | 7/2018 | Snyder, Jr. | H01R 4/2406 |
| 10,787,239 B2 * | 9/2020 | Corley | B63B 17/00 |
| 2021/0284296 A1 * | 9/2021 | White | B63B 45/02 |

* cited by examiner

*Primary Examiner* — Tulsidas C Patel
*Assistant Examiner* — Thaslimur Rahman
(74) *Attorney, Agent, or Firm* — LANWAY IPR SERVICES; Chun-Ming Shih

(57) ABSTRACT

A connector capable of converting a marine navigation light to charging equipment contains: a convertor and a Universal Serial Bus (USB) fixer. The convertor includes multiple conducting portions, a respective one conducting portion is configured to contact with the respective one coupling portion so as to guide a power of the power supply equipment. The respective one convertor also includes at least one electric wire, an end of a respective one electric wire is electrically connected with the respective one conducting portion, and the other end of the respective one electric wire is coupled with the USB fixer. The USB fixer includes a body in which a transformation unit is accommodated, the respective one electric wire is connected on the transformation unit to adjust a voltage, and the transformation unit has multiple power ports configured to supply the power after adjusting the voltage of the power.

13 Claims, 6 Drawing Sheets

CONNECTOR CAPABLE OF CONVERTING MARINE NAVIGATION LIGHT TO CHARGING EQUIPMENT

TECHNICAL FIELD

The present invention relates to a connector, and more particularly to the connector which is capable of converting a marine navigation light of a yacht or a power boat to charging equipment for an electronic product (such as 3C supplies).

BACKGROUND

With the booming development of electronic products, most people are using electronic products at any time, and most electronic products need to be connected to a USB port. However, most USB ports are installed on computers or sockets. Therefore, people need USB ports to charge electronic products, when doing outdoor activities, they will give priority to places with USB ports or transportation supplies.

For vehicles such as yachts and power boats, the USB connection port is basically set near the driver's seat. For passengers in the back seat, if they want to use the USB ports to provide power for electronic products, they must use a fairly long conductive wire, which is inconvenient. Unsightly, the long conductive wire will hinder other people's activities. To modify the electric circuit of the yacht and the power boat, other power sockets must be found on the ship.

The present invention has arisen to mitigate and/or obviate the afore-described disadvantages.

SUMMARY

The primary aspect of the present invention is to provide a connector capable of converting a marine navigation light to charging equipment which contains a convertor configured to supply a power and connected in a stern socket. The convertor is electrically connected with a Universal Serial Bus (USB) fixer which is connected with an electronic product, thus supplying the power to the electronic product.

To obtain above-mentioned aspect, a connector capable of converting a marine navigation light to charging equipment contains provided by the present invention being connected in a stern socket which is configured to provide an electrical connection of the marine navigation light, and the stern socket being electrically connected power supply equipment of a boat, the stern socket including a metal holder connected on a stern of the boat. The holder includes a receiving element fixed on a center of the holder, the receiving element has multiple coupling portions accommodated in the receiving element, and the receiving element has multiple conductive cables fixed on an outer wall of the receiving element, a first end of a respective one conductive cable is connected with a respective one coupling portion, and a second end of the respective one conductive cable being coupled with the power supply equipment, and the receiving element being connected with the connector. The connector contains: a convertor and a Universal Serial Bus (USB) fixer.

The convertor is formed in a rod shape and includes multiple conducting portions mounted on a bottom of the convertor. A respective one conducting portion is configured to contact with the respective one coupling portion so as to guide a power of the power supply equipment, the respective one convertor also includes at least one electric wire fixed therein. An end of a respective one electric wire is electrically connected with the respective one conducting portion, and the other end of the respective one electric wire is coupled with the USB fixer.

The USB fixer includes a body in which a transformation unit is accommodated, the respective one electric wire is connected on the transformation unit to adjust a voltage, and the transformation unit has multiple power ports defined thereon and configured to supply the power after adjusting the voltage of the power.

Preferably, the stern socket includes a waterproof cap.

Preferably, the respective one convertor has a fastening element fitted thereon, and the fastening element of the respective one convertor has a conical portion configured to connect with the receiving element so that a contact area of the conical portion and the receiving element is increased to fix the respective one convertor and the receiving element securely.

Preferably, the convertor is one-piece formed with the USB fixer.

Preferably, the convertor is removably connected with the USB fixer by using the at least one electric wire.

Preferably, the USB fixer further includes a wireless charging disc.

Thereby, the connector of the present invention has advantages as follows:

1) The stern socket is connected with the convertor and the Universal Serial Bus (USB) fixer to avoid a change of an electric circuit of the boat and to supply the power to the electronic product easily by using the USB fixer, thus enhancing a using convenience.
2) The convertor is removably connected with the USB fixer. In another embodiment, the convertor is one-piece formed with the USB fixer. Accordingly, the convertor and the USB fixer are configured to provide power to an electronic product based on using requirements.
3) The electronic product is charged in a wireless manner by using the wireless discharging disc.

DETAILED DESCRIPTION

Figure 1:
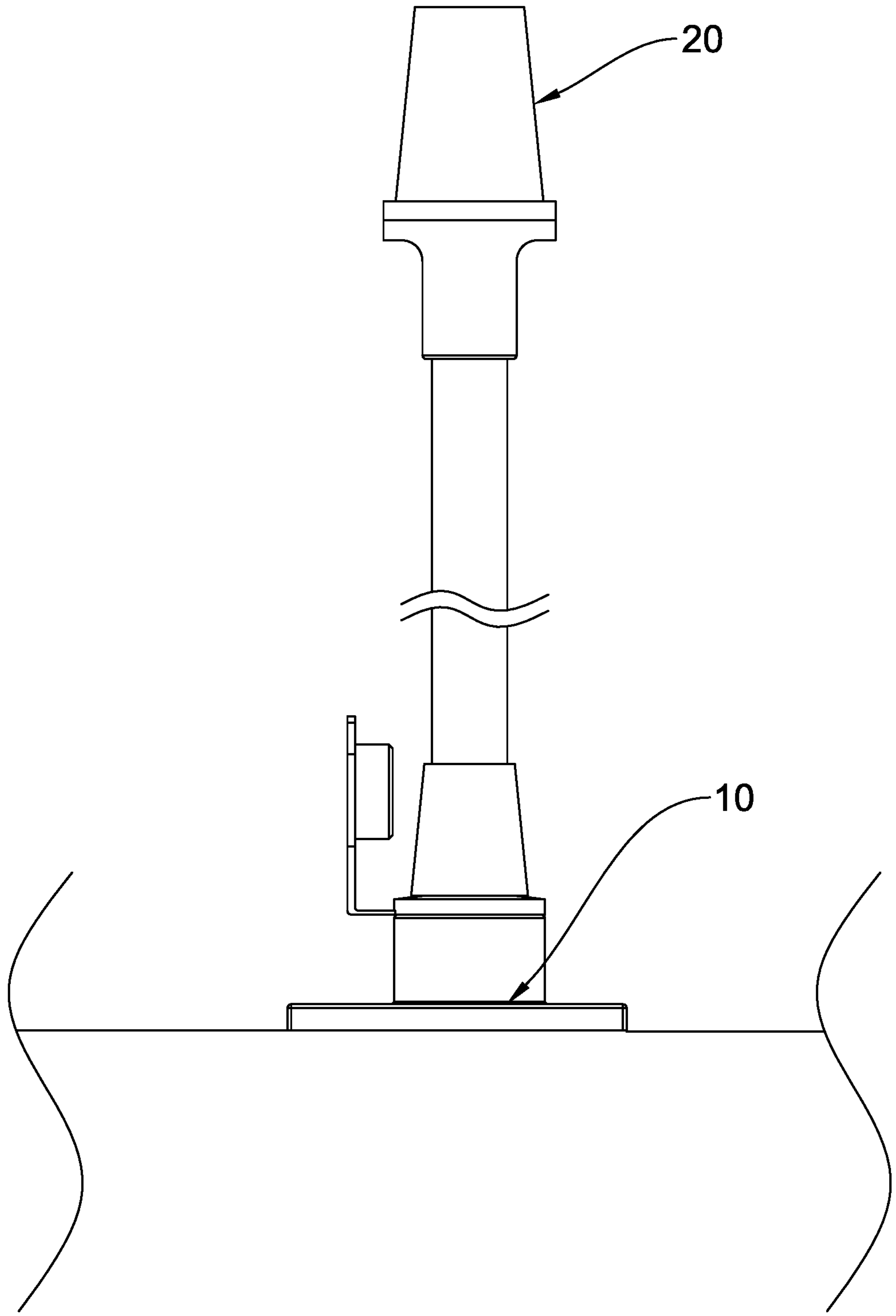
FIG. 1 is a side plan view showing the application of a marine navigation light according to a preferred embodiment of the present invention.

With reference to FIG. 1, FIG. 2, FIG. 3, FIG. 4, a connector capable of converting a marine navigation light to charging equipment according to a preferred embodiment of the present invention is connected in a stern socket 10 which is configured to provide an electrical connection of the marine navigation light 20, and the stern socket 10 is electrically connected power supply equipment P of a boat (not shown). The stern socket 10 includes a waterproof cap 11, a metal holder 12 connected on a stern of the boat, the holder 12 includes a receiving element 13 fixed on a center thereof, wherein the receiving element 13 has multiple coupling portions 14 accommodated therein, and the receiving element 13 has multiple conductive cables 15 fixed on an outer wall thereof, wherein a first end of a respective one conductive cable is connected with a respective one coupling portion 14, a second end of the respective one conductive cable 15 is coupled with the power supply equipment P, and the receiving element 13 is connected with the connector 30.

Figure 2:
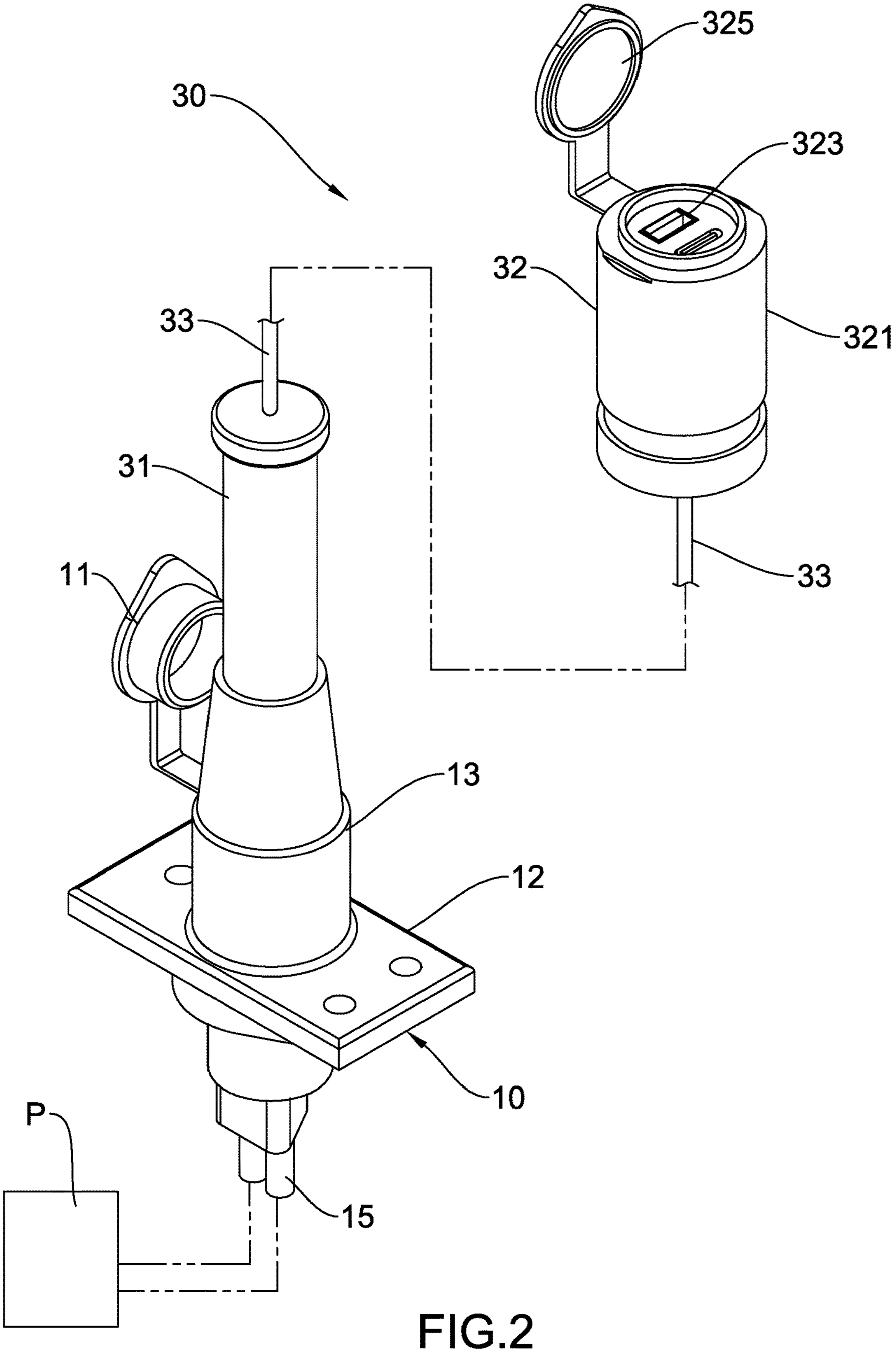
FIG. 2 is a perspective view showing the exploded components of a connector according to the preferred embodiment of the present invention.
Figure 3:
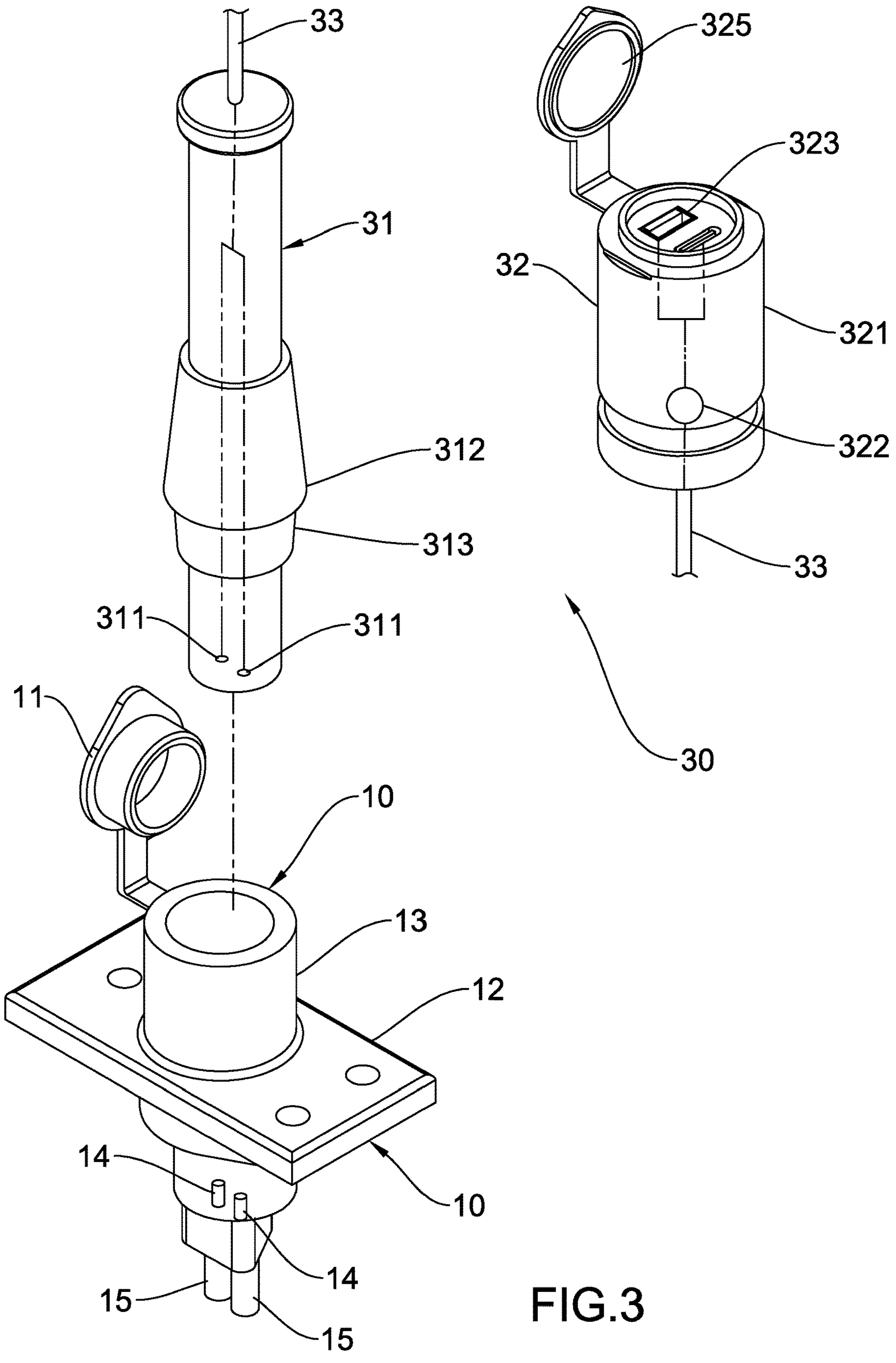
FIG. 3 is another perspective view showing the exploded components of the connector according to the preferred embodiment of the present invention.
Figure 4:
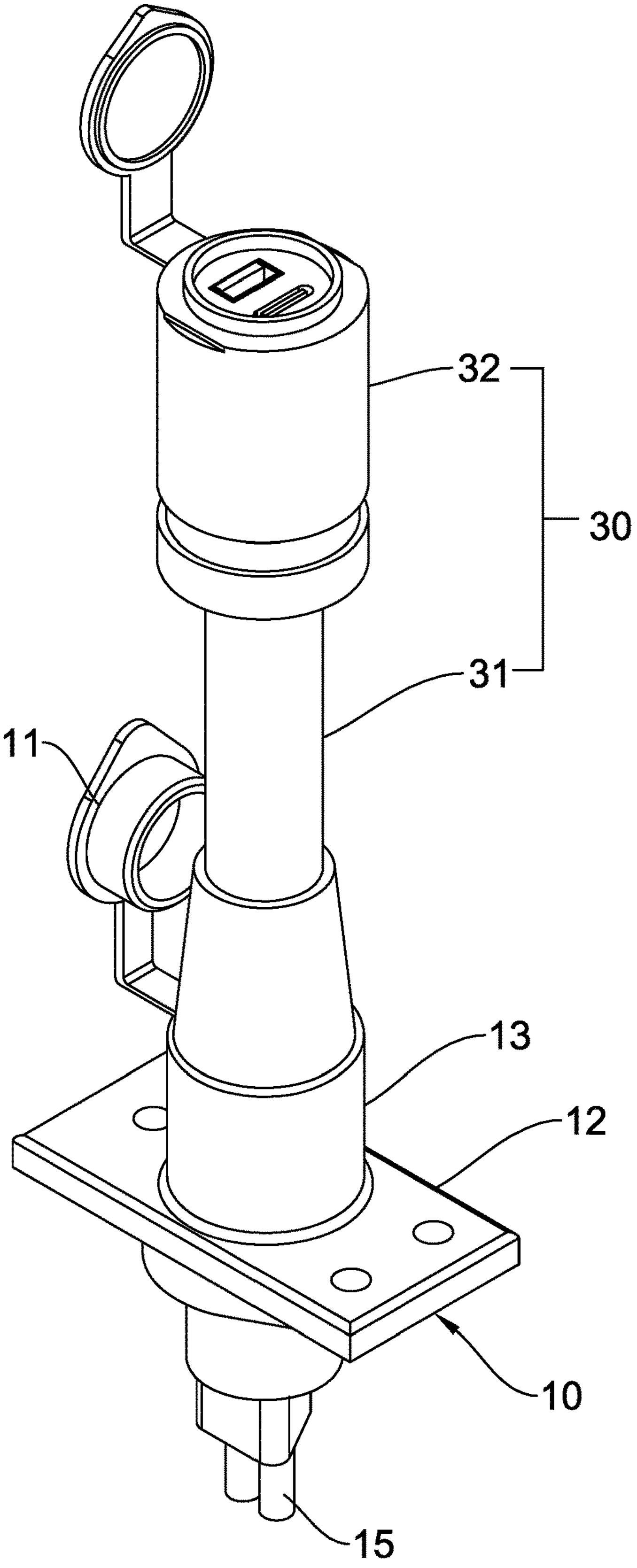
FIG. 4 is a perspective view showing the operation of the connector according to the preferred embodiment of the present invention.

Referring to FIG. 2, FIG. 3, FIG. 4, the connector 30 comprises a convertor 31 and a Universal Serial Bus (USB) fixer 32, wherein the convertor 31 is removably connected with the USB fixer 32. In another embodiment, the convertor 31 is one-piece formed with the USB fixer 32. The convertor 31 and the USB fixer 32 are configured to provide power to an electronic product.

With reference to FIG. 2, FIG. 3, FIG. 4, the convertor 31 is formed in a rod shape and includes multiple conducting portions 311 mounted on a bottom of the convertor 31, wherein a respective one conducting portion 311 is configured to contact with the respective one coupling portion 14 so as to guide the power of the power supply equipment P. The respective one convertor 31 also includes at least one electric wire 33 fixed therein, wherein an end of a respective one electric wire 33 is electrically connected with the respective one conducting portion 311, and the other end of the respective one electric wire 33 is coupled with the USB fixer 32.

As shown in FIG. 2, FIG. 3, FIG. 4, the USB fixer 32 includes a body 321 in which a transformation unit 322 is accommodated, wherein the respective one electric wire 33 is connected on the transformation unit 322 to adjust a voltage, and the transformation unit 322 has multiple power ports 323 defined thereon and configured to supply the power after adjusting the voltage of the power.

As illustrated in FIG. 2, FIG. 3, FIG. 4, the respective one convertor 31 has a fastening element 312 fitted thereon, and the fastening element 312 of the respective one convertor 31 has a conical portion 313 configured to connect with the receiving element 13 so that a contact area of the conical portion 313 and the receiving element 13 is increased to fix the respective one convertor 31 and the receiving element 13 securely.

Thereby, when a user requires the power supplied to the electronic product, the electronic product is connected with a USB wire (not shown), and the USB wire is connected to the USB fixer 32, thus supplying the power to the electronic product from the power supply equipment P.

Figure 5:
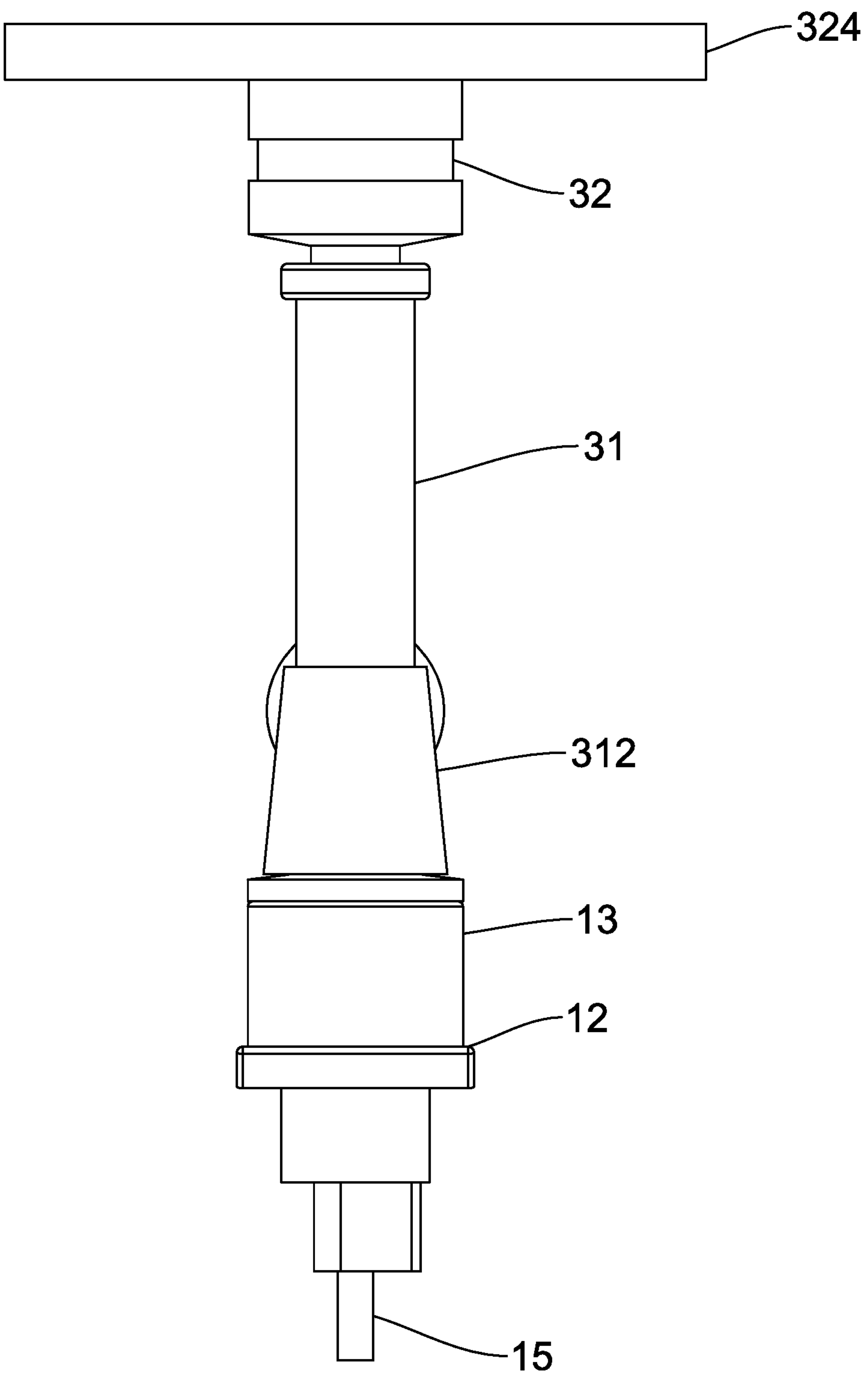
FIG. 5 is a side plan view showing the application of the connector according to the preferred embodiment of the present invention.

With reference to FIG. 5, when the electronic product is charged in a wireless manner, the electronic product has a micro receiver coil, and the USB fixer 32 includes a wireless charging disc 324, such that after the wireless charging disc 324 produces magnetic field lines, the micro receiver coil of the electronic product converts the magnetic field lines to a sensing voltage so that a voltage stabilization module boosts the sensing voltage to charge the electronic product.

Figure 6:
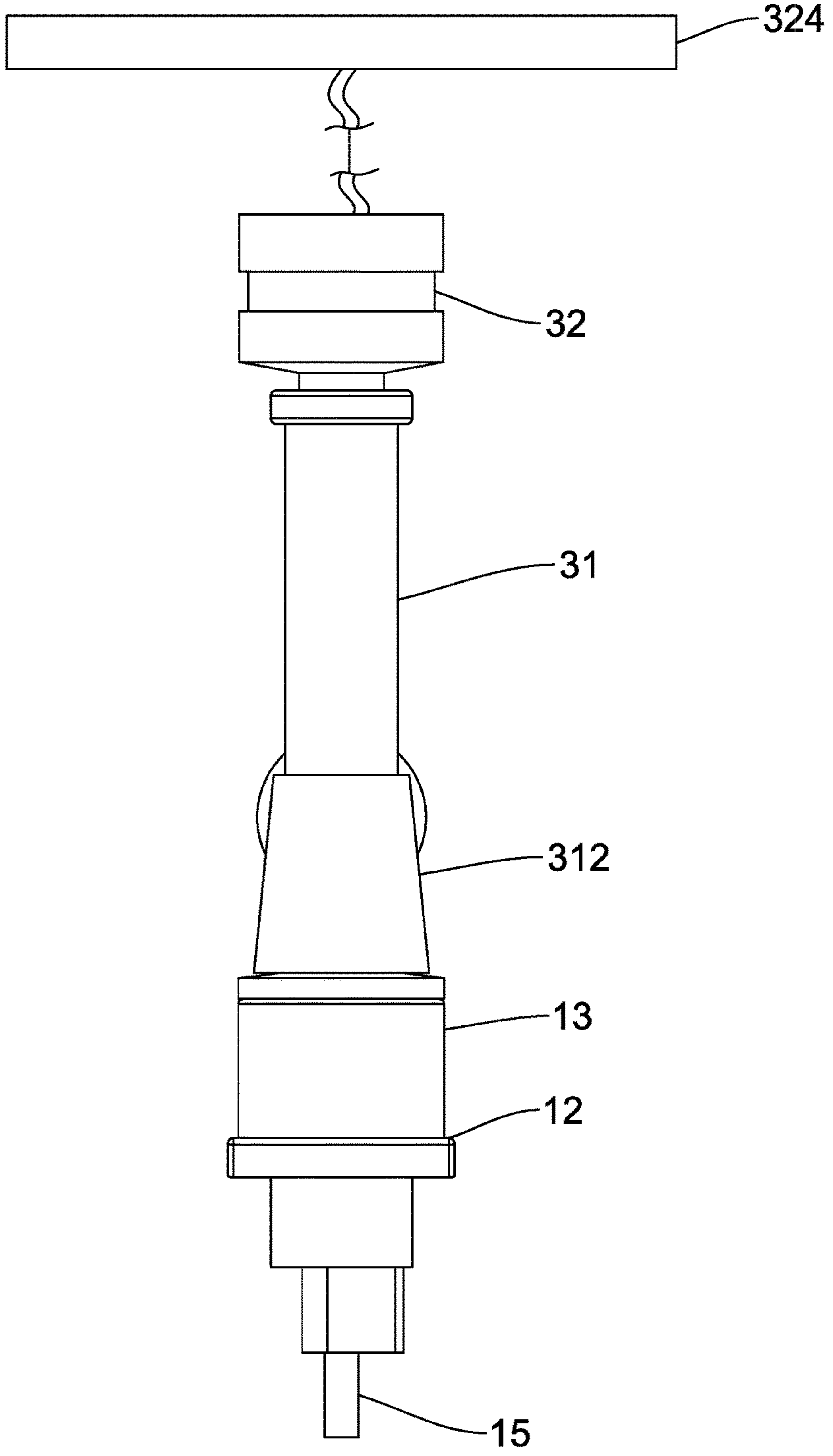
FIG. 6 is another side plan view showing the application of the connector according to the preferred embodiment of the present invention.

With reference to FIG. 6, in another embodiment, the wireless charging disc 324 is connected by using a conductive wire or a USB cable, such that when the wireless charging disc 324 is removed from the respective one convertor 31, the electronic product is placed on a desired position to avoid dropping into water.

Accordingly, the stern socket 10 is connected with the convertor 31 and the Universal Serial Bus (USB) fixer 32 to avoid a change of an electric circuit of the boat and to supply the power to the electronic product easily by using the USB fixer 32, thus enhancing a using convenience.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A connector capable of converting a marine navigation light to charging equipment being connected in a stern socket which is configured to provide an electrical connection of the marine navigation light, and the stern socket being electrically connected to a power supply equipment of a boat, the stern socket including a metal holder connected on a stern of the boat, the holder including a receiving element fixed on a center of the holder, the receiving element having multiple coupling portions accommodated in the receiving element, and the receiving element having multiple conductive cables fixed on an outer wall of the receiving element, a first end of a respective one conductive cable being connected with a respective one coupling portion, and a second end of the respective one conductive cable being coupled with the power supply equipment, and the receiving element being connected with the connector, wherein the connector comprise: a convertor and a Universal Serial Bus (USB) fixer;

wherein the convertor is formed in a rod shape and includes multiple conducting portions mounted on a bottom of the convertor, wherein a respective one conducting portion is configured to contact with the respective one coupling portion so as to guide a power of the power supply equipment, the respective one convertor also includes at least one electric wire fixed therein, wherein an end of a respective one electric wire is electrically connected with the respective one conducting portion, and the other end of the respective one electric wire is coupled with the USB fixer; and wherein the USB fixer includes a body in which a transformation unit is accommodated, the respective one electric wire is connected on the transformation unit to adjust a voltage, and the transformation unit has multiple power ports defined thereon and configured to supply the power after adjusting the voltage of the power;

wherein the respective one convertor has a fastening element fitted thereon, and the fastening element of the respective one convertor has a conical portion configured to connect with the receiving element so that a contact area of the conical portion and the receiving element is increased to fix the respective one convertor and the receiving element securely.

2. The connector as claimed in claim 1, wherein the stern socket includes a waterproof cap.

3. The connector as claimed in claim 1, wherein the convertor is one-piece formed with the USB fixer.

4. The connector as claimed in claim 1, wherein the convertor is removably connected with the USB fixer by using the at least one electric wire.

5. The connector as claimed in claim 1, wherein the USB fixer further includes a wireless charging disc.

6. The connector as claimed in claim 5, wherein the wireless charging disc is connected with the USB fixer by using a USB cable.

7. The connector as claimed in claim 5, wherein the wireless charging disc is connected with the USB fixer by using a conductive wire.

8. A connector capable of converting a marine navigation light to charging equipment being connected in a stern socket which is configured to provide an electrical connection of the marine navigation light, and the stern socket being electrically connected to a power supply equipment of a boat, the stern socket including a metal holder connected on a stern of the boat, the holder including a receiving element fixed on a center of the holder, the receiving element having multiple coupling portions accommodated in the receiving element, and the receiving element having multiple conductive cables fixed on an outer wall of the receiving element, a first end of a respective one conductive cable being connected with a respective one coupling portion, and a second end of the respective one conductive cable being coupled with the power supply equipment, and the receiving element being connected with the connector, wherein the connector comprise: a convertor and a Universal Serial Bus (USB) fixer;

wherein the convertor is formed in a rod shape and includes multiple conducting portions mounted on a bottom of the convertor, wherein a respective one conducting portion is configured to contact with the respective one coupling portion so as to guide a power of the power supply equipment, the respective one convertor also includes at least one electric wire fixed therein, wherein an end of a respective one electric wire is electrically connected with the respective one conducting portion, and the other end of the respective one electric wire is coupled with the USB fixer; and wherein the USB fixer includes a body in which a transformation unit is accommodated, the respective one electric wire is connected on the transformation unit to adjust a voltage, and the transformation unit has multiple power ports defined thereon and configured to supply the power after adjusting the voltage of the power;

wherein the convertor is removably connected with the USB fixer by using the at least one electric wire.

9. The connector as claimed in claim 8, wherein the stern socket includes a waterproof cap.

10. The connector as claimed in claim 8, wherein the convertor is one-piece formed with the USB fixer.

11. The connector as claimed in claim 8, wherein the USB fixer further includes a wireless charging disc.

12. The connector as claimed in claim 11, wherein the wireless charging disc is connected with the USB fixer by using a USB cable.

13. The connector as claimed in claim 11, wherein the wireless charging disc is connected with the USB fixer by using a conductive wire.

* * * * *